United States Patent
Haussler

(10) Patent No.: US 9,046,734 B2
(45) Date of Patent: Jun. 2, 2015

(54) LIGHT MODULATION DEVICE FOR A DISPLAY

(75) Inventor: Ralf Haussler, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 170 days.

(21) Appl. No.: 13/992,437

(22) PCT Filed: Dec. 9, 2011

(86) PCT No.: PCT/EP2011/072359
§ 371 (c)(1),
(2), (4) Date: Aug. 19, 2013

(87) PCT Pub. No.: WO2012/076702
PCT Pub. Date: Jun. 14, 2012

(65) Prior Publication Data
US 2013/0321899 A1 Dec. 5, 2013

(30) Foreign Application Priority Data
Dec. 9, 2010 (DE) .......................... 10 2010 062 728

(51) Int. Cl.
*G02F 1/29* (2006.01)
*G03H 1/22* (2006.01)
*H04N 13/04* (2006.01)

(52) U.S. Cl.
CPC .............. *G02F 1/292* (2013.01); *G03H 1/2294* (2013.01); *H04N 13/0418* (2013.01); *H04N 13/047* (2013.01); *H04N 13/0475* (2013.01); *H04N 13/0477* (2013.01)

(58) Field of Classification Search
CPC ..... G03H 1/2294; G03H 1/2205; G03H 1/22; G03H 2225/55; G03H 1/02; G03H 2001/0224; G03H 2225/11; G03H 2225/60; G03H 1/2249; G03H 1/26; G03H 2001/0491; G03H 2001/2236; G03H 2001/2263

USPC .......... 359/315, 316, 237, 254, 269–271, 359/290–292, 295, 298, 278–279, 287
See application file for complete search history.

(56) References Cited

U.S. PATENT DOCUMENTS 5,987,184 A 11/1999 Kweon et al.
2002/0126389 A1 9/2002 Moseley et al.
(Continued)

FOREIGN PATENT DOCUMENTS

CA 2766694 A1 12/2010
DE 10 2005 023 743 A1 11/2006
(Continued)

OTHER PUBLICATIONS

International Search Report, dated Apr. 3, 2012, and Written Opinion, issued in priority International Application No. PCT/EP2011/072359.
(Continued)

*Primary Examiner* — Scott J Sugarman
*Assistant Examiner* — Brandi Thomas
(74) *Attorney, Agent, or Firm* — Saul Ewing LLP

(57) ABSTRACT

A display comprising an observer window, which in 3D and/or 2D representation mode of a 3D scene can be adapted to changing eye positions. Several observers can use the display simultaneously. The display includes a light modulation device having an actuatable diffraction unit and a controllable spatial light modulator, in which a 3D scene is coded in an actuatable manner, and a control unit. An observer window can be generated using coherent light beams on alternating eye positions. The diffraction unit includes at least electrodes and a controllable material into which a prism and/or lens function and/or scatter function can be written as a diffraction grating with a phase progression in an at least one-dimensionally controllable manner.

12 Claims, 3 Drawing Sheets

(56) References Cited

U.S. PATENT DOCUMENTS

| | | |
|---|---|---|
| 2005/0017925 A1 | 1/2005 | Birdwell |
| 2008/0239420 A1 | 10/2008 | McGrew |
| 2009/0310197 A1* | 12/2009 | Schwerdtner .................... 359/9 |
| 2010/0060983 A1 | 3/2010 | Wu et al. |
| 2010/0165428 A1* | 7/2010 | Haussler .......................... 359/9 |
| 2011/0235145 A1 | 9/2011 | Futterer et al. |
| 2013/0222384 A1* | 8/2013 | Futterer ........................ 345/426 |

FOREIGN PATENT DOCUMENTS

| | | |
|---|---|---|
| DE | 10 2008 043 620 A1 | 5/2010 |
| EP | 0 833 183 A1 | 4/1998 |
| WO | 03/019952 A1 | 3/2003 |
| WO | 2007/131817 A1 | 11/2007 |
| WO | 2008/049916 A2 | 5/2008 |
| WO | 2010/066700 A2 | 6/2010 |
| WO | 2010/149587 A2 | 12/2010 |

OTHER PUBLICATIONS

Wyrowski et al., J. Optical Society of America, Bd. 5, Nr. 7, pp. 1058-1065 (1988).

* cited by examiner

LIGHT MODULATION DEVICE FOR A DISPLAY

CROSS REFERENCE TO RELATED APPLICATIONS

This application claims the priority of PCT/EP2011/072359, filed on Dec. 9, 2011, which claims priority to German Application No. 10 2010 062 728.3, filed Dec. 9, 2010, the entire contents of each of which are hereby incorporated in total by reference.

BACKGROUND OF THE INVENTION

The present invention relates to a light modulator device for a display, said light modulator device comprising at least one spatial light modulator and at least one controllable diffraction device, said components being controllable by a control unit, with the display being designed for a three-dimensional representation of images of a 3D scene.

The field of application of the present invention includes displays with an observer window, for example holographic or autostereoscopic displays, where a 3D scene is encodable, for example, in a hologram or where the stereoscopic images of the 3D scene are representable two- and/or three-dimensionally. Observers can perceive the 3D scene as a holographic reconstruction or as a stereo image if at least one observer window coincides with the positions of observer eyes.

With a holographic display, the observer can see a reconstructed scene of an object in a reconstruction space which is spanned by the observer window and the screen if an observer window coincides with the eye pupil. The eye pupil is situated at a certain eye position for which the reconstruction must be generated. However, if the observer moves sideways or along the optical axis of the display, the observer window will no longer coincide with the eye pupil of the observer and, consequently, the observer will not be able to see the complete reconstruction any longer. To enable the observer to see the complete reconstruction again, the position of the observer window must be matched again to the new position of the eye pupil (eye position).

In this respect, it is known in the prior art, for example from documents DE 10 2005 023 743 A1 or WO 2007/131817 A1, the entire contents of both of which being fully incorporated herein by reference, to move the observer window laterally and/or axially to the new eye position with the help of a deflection element. When doing so, the size of the observer window for the new eye position must be adapted in a defined way depending on its distance to a reference plane, which can, for example be the plane of the controllable light modulator.

A number of documents, for example DE 10 2008 043 620 A1 or WO 03/019952 A1, the entire contents of both of which being fully incorporated herein by reference, describe autostereoscopic displays where 3D scenes can be represented three-dimensionally and where these scenes can be seen by at least one observer through observer windows, which are also referred to as sweet spots. Observer windows can be generated at changing observer eye positions here, too.

In an autostereoscopic display, the reflection angle of the light sources determines the size of the observer window, which is formed by imaging the light sources into the observer plane by a lens array. If the axial distance to a reference plane (e.g. the surface of the display or light modulator) changes, then the size of the observer window is known to change as well, thereby possibly inducing the problem of the observer windows for two different eyes overlapping, disturbing the perception of the three-dimensional representation by the individual observers. If the observer window becomes smaller, there might be the problem that the 3D scene cannot completely be perceived three-dimensionally.

The same applies if the holographic display is operated with a 1D encoding method in a single-parallax mode and an observer window having the size that corresponds with the size of an eye pupil is to be generated in the incoherent direction.

Further, an autostereoscopic or holographic display is required to be designed such that can be switched from the 3D (three-dimensional) mode to the 2D (two-dimensional) mode. To do so, a switchable diffusor (light scattering element) is additionally disposed in the optical path; see for example document U.S. Pat. No. 5,897,184, the entire contents of which being fully incorporated herein by reference. In the 3D mode, the diffusor can, for example, be in a transparent, non-diffusing state. The size of the observer window to be generated, which should at least correspond with the diameter of an eye pupil, is continuously adapted to the distance of a detected eye position and the display in the 3D mode.

In the 2D mode, the diffusor is switched to the diffusing state. The observer window should be at least that large that it covers both eyes of an observer or even all eyes of all observers. Additional optical elements, such as a switchable diffusor or the above-mentioned deflection elements, make a display for the representation of three-dimensional image contents more complicated, more expensive and more susceptible to faults.

A switchable diffusion element as such is known, for example, from the international patent application PCT/EP2010/058625 (WO 2010/149587 A2), the entire contents of which being fully incorporated herein by reference.

SUMMARY OF THE INVENTION

It is the object of the present invention to provide a display for representing a 3D scene in the 3D mode and/or in the 2D mode at changing eye positions. Both the representation of the autostereoscopic or holographic images of the 3D scene and the change to the 2D mode shall be achieved with as few optical components as possible. Such a display shall be usable by multiple observers at the same time.

The invention is based on a display which is controllable in a 3D mode and in a 2D mode to represent a 3D scene and which comprises a light modulator device with a controllable spatial light modulator and at least one controllable diffraction device, said components being controllable by a control unit, where an observer window is generable at varying eye positions with coherent light beams.

According to this invention, the object can be achieved with a light modulator device where the diffraction device comprises electrodes and a controllable material to which a prism function and/or lens function and a diffusion function are controllably encodable at least in one dimension with a phase profile as a diffraction grating, where the diffraction grating that represents the diffusion function has phase shifts which are controlled via changing frequencies depending on a distance to a detected eye position for which the defined size of the observer window is controllable for a given representation mode. Here, the diffusion function which is encoded to the diffraction device replaces an additional optical element in the form of a diffusion element which would otherwise typically be disposed in such a light modulator device to be able to realise a 2D mode and which must be controllable at least in one dimension. If detected eye positions have a different distance to the diffraction device, the diffusion angle for transmitted light beams can preferably be controlled such that the defined size of an observer window remains unchanged to the 3D mode.

If for z tracking of the observer (axial direction) the focal length of a lens function which is encoded to a controllable diffraction device is changed, then an observer window can be generated in a new observer plane. However, the size, or at least the horizontal width, of the observer window changes in proportion to the distance between the observer window and the reference plane in the incoherent direction. An observer window which is too small can no longer cover the entire eye pupil, and an observer window which is too large can cause cross-talking to the neighbouring eye. This problem can be overcome with the present invention. A defined width of the observer window of 2-3 cm, for example, can be maintained when the eye position changes in the axial direction if this width is specifically controlled by the diffraction device for detected different eye positions.

Thanks to the phase shifts which are encoded as a diffraction grating, the light beams which are transmitted through the light modulator have diffusion angles which can preferably be changed by varying the number of electrodes which are addressed simultaneously.

To implement the present invention, two different methods of computing control values, which are encoded as phase values to realise the diffusion function, can preferably be used. The phase values can, for example, be computed as sequences of random phase values or, for example, be computed with a Fourier transformation using an iterative method where an intensity distribution is defined in an observer window which is generated in an observer plane.

According to this invention, the phase shifts can be controlled with a sequence of random phase values which can be selected by the control unit from a spatial frequency spectrum and/or from a range of values. This method has the advantage that it can be implemented with little computing power. The observer window shows a continuous intensity distribution of the light at a detected eye position, where the observer window is not sharply defined.

When using a method where the range of phase values is reduced while the frequency is maintained, the size of the observer window can be changed (here: its width reduced) as well. The maximum phase of the range of phase values can, for example, be $\pi$ instead of $2\pi$.

Phase values can also be retrieved from tables which contain control values in the form of phase values for co-ordinates of possible positions of observer eyes, in order to reduce the computing time.

The diffusion function is controllably encodable with a phase profile as a diffraction grating with which the light beams generate an observer window for the observer eyes of an observer, said observer window having a size with which a 2D mode can be realised by the control unit. According to this invention, switching from the 3D mode to the 2D mode can thus be realised without the need to control an additional switchable diffusion element in the optical path. As the diffusion function is controlled by way of encoding a diffraction grating, the defined size of the observer window can remain unchanged or be changed controllably, such that the 3D mode is controllably switchable to the 2D mode for an observer. Changing from the 2D mode to the 3D mode can be realised as well with the inventive light modulator device in that the diffraction device is controlled accordingly.

Further, the diffusion function is controllably encodable with phase values as a diffraction grating, said phase values being computable with the method of an iterative Fourier transformation.

The computation of the iterative Fourier transformation is performed with complex matrix values which show at least a one-dimensional distribution of values and with which at least one diffraction grating is encodable at least in one direction, where an intensity distribution and the size, or at least the horizontal width, of the observer window are defined.

The size of the observer window is controllable at least in one dimension by way of encoding the diffusion function to the diffraction device or by way of defocused imaging of light sources which emit at least partly coherent light beams. A spherical phase profile is thus encodable as a diffraction grating to the diffraction device for defocused imaging into a plane close to the observer plane.

In a further embodiment of the diffraction device, a lens function with a spherical phase profile is encodable as a diffraction grating, where the size of the observer window in the plane close to the observer plane is controllable one-dimensionally in the incoherent direction.

A diffraction grating which is controllable with phase profiles to realise prism or lens functions can only deflect or focus incident light. The image content which is perceivable from the observer window, i.e. the content which can render a 3D scene visible holographically or autostereoscopically in the 3D display, is generated in a separate SLM. The size of an observer window which is generated with a controlled diffraction grating is defined for a certain observer distance (detected eye position) such to match the size of an eye pupil of a corresponding observer.

Due to the fact that, for the detected eye position, control values are encodable to the controllable material of the diffraction device such that a computed refractive index modification becomes generable, emitted light beams can be modulated with a prism function (lateral deflection) and/or a lens function (axial shift of the observer window) and/or a diffusion function.

In the light modulator device, light diffusion can take place in the 2D mode for locally detected eye positions of an observer, while the 3D mode remains active for other eye positions of other observers. For this, the corresponding diffusion function for the representation of a 3D scene in a 2D mode for the particular observer is encodable to the controllable material of the diffraction device.

The diffraction device can, for example, comprise at least one controllable liquid crystal (LC) layer as the controllable material, or a layer of a solid crystal in which the refractive index is controllable.

With a two-dimensionally controlled diffraction grating, an observer window can be generated at laterally and/or axially different eye positions.

A defined size or width of the observer window of 2-3 cm, for example, for a 3D mode can be maintained unchanged when the distance of the eye position changes at least in the axial direction. According to this invention, an observer window is controllably generable for individual detected eye positions with a diffusion function which is encoded as a diffraction grating.

The present invention further comprises a display with a light modulator device as described above, where stereoscopic and/or holographic image contents are controllably representable in the light modulator device.

The combination of a controllable change in the size of an observer window and a change of the representation mode in a display according to this invention with the help of a controllable device for refractively and diffractively affecting light preferably permits the number of optical means in the display to be reduced.

BRIEF DESCRIPTION OF THE DRAWINGS

The invention is described and explained in more detail below with the help of drawings. The Figures are schematic diagrams, where.

DETAILED DESCRIPTION OF THE INVENTION

Identical components of a 3D display are given the same reference symbols in all of the figures. The 3D display can be a holographic display or an autostereoscopic display.

For this invention it is assumed that light beams which are transmitted through a diffraction device can be modulated with a prism function and/or lens function and a diffusion function by way of refractive index modulation in a controlled layer of the diffraction device. With these functions, light beams can be deflected and/or diffused at least one-dimensionally into a defined direction. The deflection or diffusion of light beams can be defined in that these functions are controllably encodable at least in one dimension with voltage profiles as a diffraction grating to the controllable layer, e.g. a liquid crystal (LC) material.

For controlling the controllable material, the diffraction device comprises an electrode array with a multitude of electrodes which are disposed in parallel side by side and which are of a striped or linear shape.

The display further comprises a light modulator device with which incident, at least partly coherent light beams are modulated with stereoscopically or holographically encoded images of a 3D scene if the light modulator device is controlled accordingly by a control unit. The 3D scene is holographically reconstructable with a holographic display or three-dimensionally perceivable with an autostereoscopic display.

Figure 1A:
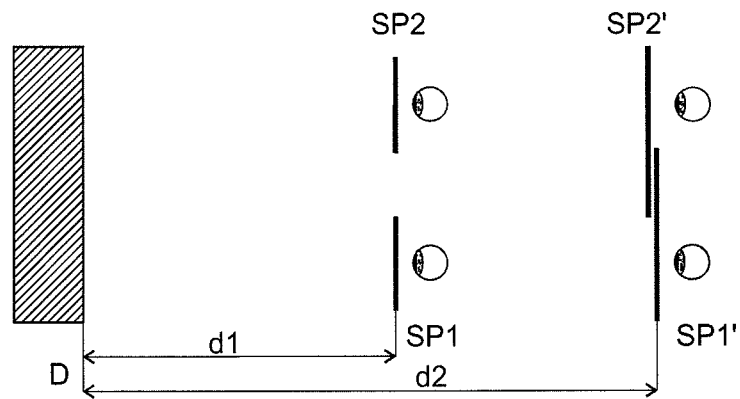
FIG. 1a is a top view showing a light modulator device of a display with observer windows whose width changes proportional to the distance, representing the prior art.
Figure 1B:
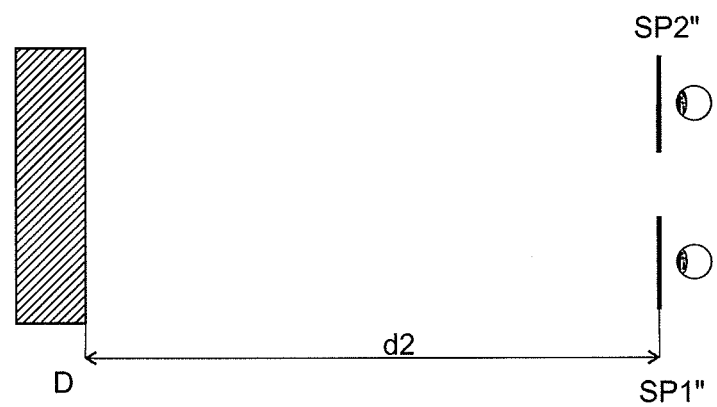
FIG. 1b is a top view showing a light modulator device with generated observer windows whose width is adapted to the distance, according to this invention.

FIGS. 1a and 1b are top views which show schematically a display with observer windows of different size. It can be a holographic or autostereoscopic 3D display.

FIG. 1a shows a display D with observer windows SP1, SP2 which have a defined size or horizontal width at an eye position at the distance d1, and with observer windows SP1', SP2' at an eye position at the distance d2, said observer windows SP1', SP2' having a size or horizontal width that has changed proportional to the distance d2. At the distance d2, the observer windows are so large that they can overlap. Observer eyes at the eye position d2 would perceive a disturbing cross-talking of the image content for the left eye to the observer window for the right eye, and vice versa. This cross-talking would impair the quality of the 3D perception. This effect is known in the prior art.

The centres of the observer windows SP1, SP2 preferably have a distance of about 65 mm, which corresponds to a typical eye distance. The observer windows through which a 3D scene is perceivable in the 3D mode in a holographic or autostereoscopic display should optimally each comprise a width of 2-3 cm.

Referring to FIG. 1b, the display D according to this invention comprises at least one controllable light modulator device and a control unit with which a controllable spatial light modulator and at least one controllable diffraction device are controlled. The mentioned components are not individually shown in the figure.

The diffraction device can comprise a controllable material, for example oriented controllable liquid crystal (LC) molecules, which is controllable through electrodes. The diffraction grating shall preferably be controlled with the help of linear electrodes which are disposed in parallel side by side, where said electrodes can also form a matrix. A potential can be applied on each electrode so to generate a voltage profile. The LC molecules are oriented depending on the voltage, thereby generating a certain refractive index profile. The light beams which are transmitted through the diffraction device can be given a phase shift according to the orientation of the molecules.

The refractive index profile and the corresponding potentials for each electrode which are required to deflect the light beams such that the observer window is generable at the detected eye position are computed for that detected eye position. Further, a phase profile for a diffusion function can additionally be controlled such that the size of the observer window is controllably adaptable to this detected eye position with the light beams.

Specifically, the controllable material can be controlled with a variable number of electrodes such that the diffusion function is encodable as a diffraction grating at least one-dimensionally with a phase profile with locally altering frequency.

The size of the observer window can also be generated with a two-dimensionally controlled diffraction grating at laterally and/or axially different eye positions.

Referring to FIG. 1b, according to this invention, two observer windows SP1" and SP2" can be generated with the transmitted light beams at the distance d2 to the display D, said observer windows having an optimal, defined size so that they cannot overlap. A perception of a 3D scene in the 3D mode becomes possible without disturbing cross-talking, where the 3D mode shall be understood to be the three-dimensional representation mode of the display.

If there are no left and right stereo images of the scene to be represented, or if a 3D mode cannot be realised fast enough for all observers by the control unit, then a 2D mode can be realised in the observer window by way of controlling the diffraction device differently. For this, a diffraction grating must be encoded with which a diffusion angle of the transmitted light beams is defined with which an observer window is generable which covers both eyes of an observer.

According to this invention, a 3D/2D switching is realisable for at least one observer by modifying a diffusion function which is encoded one-dimensionally to a controllable material.

In an embodiment, a display can comprise a light modulator device where a diffusion angle for the 2D mode is controllably encodable for a second detected pair of eyes, while the 3D mode is maintained for a first detected pair of eyes. Stereoscopic or holographic images are shown sequentially on the light modulator and can be shared in the observer windows which are generable for the first and second observer and which can have a different size according to the different control of the diffraction grating.

A lens function is encoded as a diffraction grating with a spherical phase profile, while a prism function is encoded as a diffraction grating with a linear phase profile. According to this invention, a diffusion function can be encoded with phase values which can be computed using two different methods.

In a first method, random phase values for controlling the size or horizontal width of the observer window are determined or computed. The diffusion function can, for example, additionally be encoded to a diffraction device to which a lens function and/or prism function has already been encoded. For the diffusion function, a sequence of random phases is generated with values ranging from 0 to $2\pi$ being arbitrarily selected. It is also possible to use a sequence of pseudo-random phases with values being computed using a pseudo-random number function.

The size, or at least the horizontal width, of the observer window can be adjusted by the frequency of the random phase sequence or by phase shifts which are controlled based on the random phase sequence. A maximum horizontal width can be controlled by changing the phase by a random value from one electrode to the nearest neighbouring electrode. The horizontal width can be computed easily as follows:

Following the equation that describes the diffraction of light, $\sin(\theta)=\lambda/p$, for a wavelength $\lambda$ of 532 nm and a pitch p of the electrodes of 1 µm, the resultant diffusion angle $\theta$ is 32°. The diffusion angle $\theta$ defines the maximum width w of the observer window as $w=\tan(\theta)*d$, where d is the distance between the diffraction device or the 3D display in FIG. 1b and the observer plane. In this example, the horizontal width w is 0.44 m at a distance d of 0.7 m. The width w is measured from the centre of the observer window towards its edge, where the intensity decreased to zero. This applies to a fill factor of the diffraction device of 1, i.e. the diffraction device does not have any non-transparent regions.

A smaller horizontal width w can, for example, be achieved in that the frequency of the random phase sequence is lowered or in that the phase shifts which are controlled by this random phase sequence become smaller. Here, the phase is not modified by applying a random value between two neighbouring electrodes, but only between every other electrode. In this example, with the above-mentioned figures but p=2 µm, the width w of the observer window would roughly be halved to w=0.19 m. The phase shift can also be controlled such that a defined number of electrodes, e.g. two or more neighbouring electrodes, are controlled with the same random phase sequence.

For each controlled electrode of the diffraction device, the phase values of the lens function, prism function and diffusion function are added to get a total phase value if these functions are to be realised simultaneously by one diffraction grating. If the total phase value does not lie within the range of values of between 0 and $2\pi$, $2\pi$ is added or subtracted as many times as necessary to situate the total phase value within the range of values of between 0 and $2\pi$. The voltage applied to the electrodes is such that the diffraction grating modulates the phase by this total value at the corresponding position.

A diffraction grating which is controlled to realise the diffusion function shows phase shifts which are encoded controllably at changing frequencies depending on a distance of the detected eye position. These phase shifts serve to adjust the diffusion angles of transmitted light beams such that the size of the observer window is modifiable at least horizontally depending on a distance of the detected eye position to the light modulator if they are controlled accordingly. Further, the representation mode of the 3D scene which is to be realised in the observer window must be given.

Figure 2A:
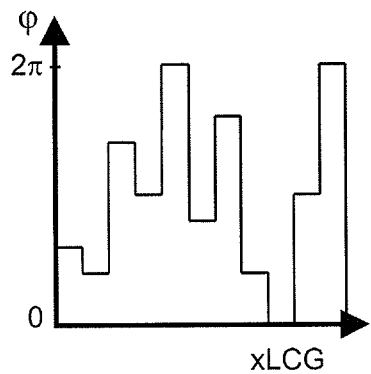
FIGS. 2a, 3a, 4a are exemplary phase profiles for controlling observer windows with different sizes, according to this invention.
Figure 2B:
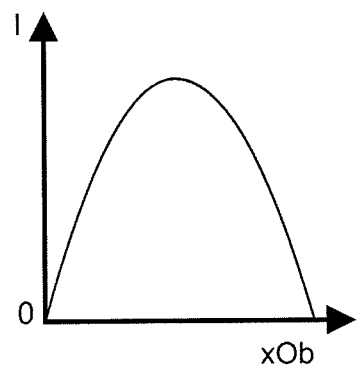
FIGS. 2b, 3b, 4b are exemplary presettable horizontal intensity distributions for defined observer window sizes, according to this invention.

The controlling of the horizontal width of the observer window is shown in FIGS. 2 and 3. FIG. 2a shows exemplarily the phase values $\phi$ which are encoded as a diffraction grating as a function of the x co-ordinate xLCG. FIG. 2b shows the intensity distribution I in the observer window as a function of the x co-ordinate xOb in the observer plane for an eye position. The phase values were computed at high frequency between 0 and $2\pi$, so that a wide observer window is realisable.

Figure 3A:
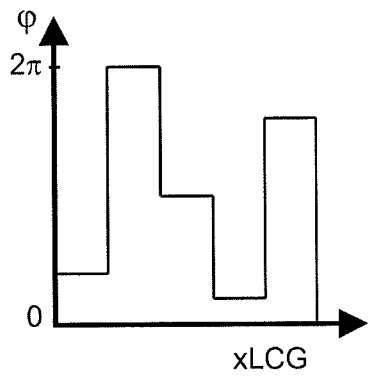
Figure 3B:
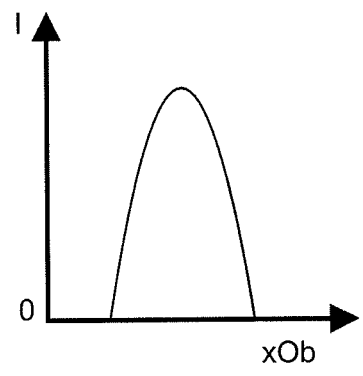

FIGS. 3a and 3b show, at the same scales as those in FIG. 2, the phase profile which is encoded to the diffraction device and the resultant intensity distribution I in the observer window, where the phase values were computed with a frequency spectrum of lower frequencies between 0 and $2\pi$. The number of phase shifts in FIG. 3a for the observer window in FIG. 3b is smaller that that in FIG. 2a. With these phase shifts, an observer window is realisable whose size will only slightly change for a new eye position. The size of the observer window in the observer plane can be changed at a given wavelength of the light by varying the frequency spectrum.

The phase shifts and thus the diffusion angles for the light beams can be controlled by modifying a maximal frequency and/or a range of values for the random phases. A new observer window to be controlled can be changed, i.e. widened or narrowed, only to a small degree through phase shifts which result from a phase profile with a small range of values and/or a low maximal frequency. The random phases can thus preferably be used to change the size of the observer window according to varying distances between the display and the observer plane.

High-frequency phase shifts shall be understood to be a sequence of encoded phase values which show a large number of different phase values in a locally limited region (see FIG. 2a). In contrast, in low-frequency phase shifts, the number of different phase values in this locally limited region is lower (see FIG. 3a).

Figure 4A:
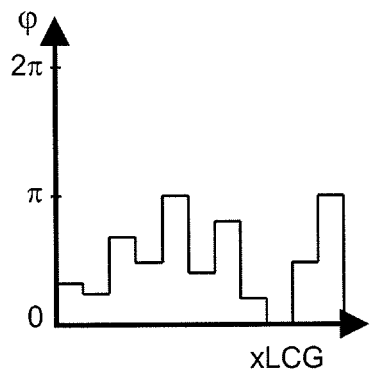
Figure 4B:
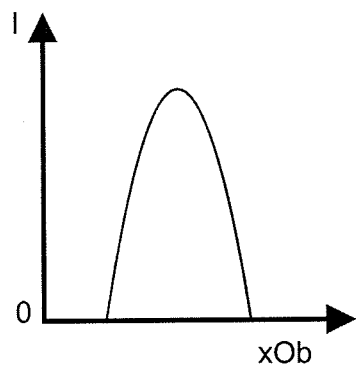

FIGS. 4a and 4b show an alternative way of controlling a diffraction grating with which the width of the observer window can be reduced. Instead of decreasing the maximal frequency of the phase values, the range of phase values can be reduced. Referring to FIG. 4a, the maximum phase value is for example $\pi$ instead of $2\pi$ as in FIG. 2a.

These examples shall illustrate the method of the arithmetic computation of random numbers which are encodable as a diffraction grating to represent random phase values for controlling the size or horizontal width of the observer window and the consequential optical effects. This method has the advantage of requiring only little computing power, but causes an intensity distribution in the observer window that is not sharply defined, but which rather resembles a Gaussian distribution.

The computing time can further be reduced in that phase values are retrieved, for example, from tables which contain control values in the form of phase values for co-ordinates of possible positions of observer eyes.

The phase profiles of a diffusion function to be encoded to the diffraction device for controlling the size or horizontal width of the observer window can also be found with a second method that uses iterative Fourier transformations. This method requires more computing power than the first method, but allows an observer window to be generable which comprises a defined intensity distribution with precisely defined limits for at least one observer eye.

The diffusion function can be computed with the help of a Fourier transformation for a defined intensity distribution at at least one eye position in the observer plane. Since the encoded diffraction grating can only modulate the phase of the incident light, only phase values with constant amplitude should be computed and encoded. Computing these phase values by way of iterative Fourier transformation (IFT) is known to require Fourier transformations and inverse Fourier transformations between the plane of the diffraction device and the observer plane until a certain stop criterion is reached.

Figure 5:
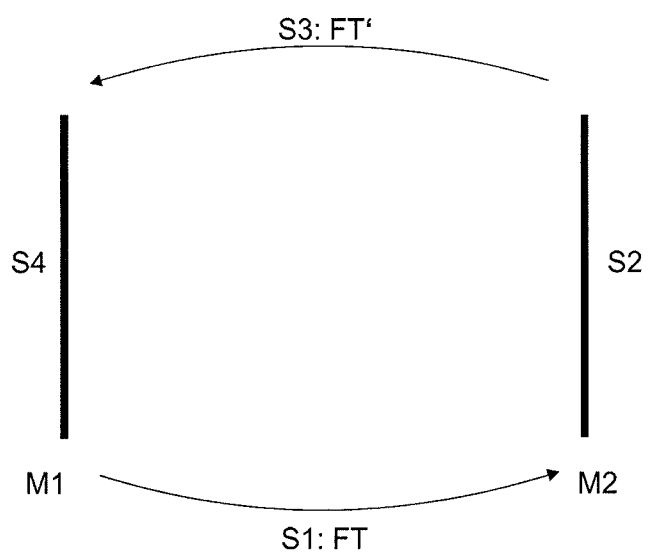
FIG. 5 illustrates an iterative transformation method for finding control values for a phase profile with which a diffusion function is controllably encodable.

The process of the iterative Fourier transformation method is shown schematically in FIG. 5 and will now be explained briefly. Transformations and back-transformations of matrix values which are available in two matrices M1 and M2 are performed with four computing steps of an iterative computing process. The iterative computing process is repeated multiple times, where the matrices M1 and M2 comprise the same number of complex matrix values. The absolute values of the matrix values of M1 represent the square roots of the intensity distribution in the observer plane. The phases of the matrix values of the matrix M2 represent the phase distributions in the diffraction grating of the diffraction device. The matrices M1 and M2 can be computed with a one- or two-dimensional distribution of values. The intensity distribution in the observer plane is controllable in one direction with a one-dimensional distribution of values. If two one-dimensional diffraction gratings are encoded controllably to the plane of the diffraction device in a crossed manner, i.e. at an angle of 90°, or if a two-dimensional diffraction grating is used, the intensity distribution of the diffused light beams is controllable in two lateral directions in the observer plane.

The absolute values of the complex matrix values of M1 include amplitude values at the beginning of the iteration, where the square roots of the amplitude values correspond with the intensity distribution to be defined in the observer plane and form the set-point values of M1. The intensity distribution to be defined is computed at the scan points of the matrix M1. The phases of the matrix values of M1 are given arbitrary values. The four computing steps which are repeated in the iteration are as follows:

S1: Fourier transformation FT from matrix M1 to matrix M2
S2: Setting the absolute values of the matrix values of M2 to the value 1 and keeping the phases of the matrix values of M2 unchanged
S3: Inverse Fourier transformation FT' from matrix M2 to matrix M1
S4: Setting the absolute values of the matrix values of M1 to the set-point values and keeping the phases of the matrix elements of M1 unchanged These four computing steps are repeated in an iterative process, where the absolute values of the matrix values of M1 more and more approximate to the set-point values. The iteration is stopped when the current amplitude values deviate only very slightly from the set-point values, i.e. less than 10%, this being the stop criterion. The matrix values of M2 which are obtained when the iteration is stopped are then used to control the electrodes so to generate a diffusion angle and thus an observer window of defined size or horizontal width at a given distance.

If the observer plane is not the Fourier plane of the diffraction grating, a Fresnel transformation is used for computing instead of the Fourier transformation FT or the inverse Fourier transformation FT'. The transformations differ in a spherical phase profile or in an inverse spherical phase profile which depends on the distance between the observer plane and the Fourier plane of the diffraction grating.

The IFT method serves to compute the control values for the diffraction grating with which an observer window is generable which has a defined intensity distribution. In particular, it allows an observer window with a preferred width of about 2-3 cm and a preferably rectangular intensity distribution to be generated by controlling the grating functions accordingly. If an observer window which was computed with the IFT method and generated with the phase values thereby obtained is positioned on each of the eyes of an observer, the eyes can be illuminated homogeneously with different intensity distributions, and a cross-talking of light or image contents to non-detected observer eyes can be reduced.

The IFT method can be used in real-time in the display. The matrix values of the matrix M2 are preferably computed in advance for several intensity distributions in the observer plane of the 3D display and stored in a table, from which they are retrievable as necessary.

Alternatively, light sources can be imaged in a defocused way in order to widen the observer window. For this, a lens function is encoded controllably to the diffraction device with such a focal length that the light sources are imaged to a plane close to the observer plane in the incoherent direction. They are thus diffusely perceivable in the observer plane, and the observer window is enlargeable in the incoherent direction.

Additional optical diffusion elements or switching elements for 3D/2D switching can thus preferably become superfluous with this invention.

The invention claimed is:

1. A light modulator device for a display to represent a 3D scene which is controllable in a 3D mode and in a 2D mode, with a controllable spatial light modulator and at least one controllable diffraction device, said components being controllable by a control unit, where an observer window is generable at varying eye positions using coherent light beams, wherein the diffraction device comprises electrodes and a controllable material to which a prism function and a diffusion function are controllably encodable; or to which a lens function and a diffusion function are controllably encodable; or to which a prism function, a lens function and a diffusion function are controllably encodable at least in one dimension as a diffraction grating with a phase profile, where the diffraction grating that represents the diffusion function comprises phase shifts which are controlled by variable frequencies depending on a distance to a detected eye position for which the defined size of the observer window is controllable for an above-mentioned representation mode.

2. The light modulator device according to claim 1, wherein the light beams comprise diffusion angles which are alterable by a variable number of simultaneously addressed electrodes.

3. The light modulator device according to claim 1, wherein the phase shifts are controllable by a sequence of random phase values which are selectable by the control unit from a spatial frequency spectrum; or from a range of values; or from a spatial frequency spectrum and a range of values.

4. The light modulator device according to claim 3, wherein the maximum range of phase values used for resizing the observer window is reduced.

5. The light modulator device according to claim 1, wherein phase values are retrievable from tables which contain phase values for co-ordinates of possible positions of observer eyes serving as control values.

6. The light modulator device according to claim 1, wherein the diffusion function is controllably encodable with phase values as a diffraction grating to the controllable diffraction device, said phase values being computable with the method of an iterative Fourier transformation.

7. The light modulator device according to claim 6, wherein the computation of the iterative Fourier transformation is performed with complex matrix values showing at least a one-dimensional distribution of values, whereby at least one diffraction grating is controllably encodable to the controllable diffraction device at least in one direction, said diffraction grating comprising a defined intensity distribution.

8. The light modulator device according to claim 1, where the size of the observer window is controllable at least in one dimension by encoding the diffusion function to the diffraction device or by a defocused imaging of light sources, wherein for a plane close to the observer plane a spherical phase profile is controllably encodable as a diffraction grating to the controllable diffraction device.

9. The light modulator device according to claim 1, wherein the diffusion function is controllably encodable using a phase profile as a diffraction grating whereby diffusion angles are controllable for generating an observer window for the observer eyes of an observer for whom a 2D mode is provided by the control unit.

10. The light modulator device according to claim 1, wherein a diffusion function for the 2D mode for locally detected eye positions of an observer is provided, while the 3D mode is maintained for other eye positions of other observers.

11. A display with a light modulator device according to claim 1, wherein stereoscopic image contents, or holographic image contents, or stereoscopic and holographic image contents are controllably representable in the light modulator device.

12. The display according to claim 11, where the light modulator device comprises a diffraction device allowing to control observer windows for at least two observers, wherein the size of the two observer windows for eye positions for representing a 3D scene are simultaneously controllably alterable when the display is operated in the 3D mode.

* * * * *